(12) United States Patent
Buchanan et al.

(10) Patent No.: US 11,037,451 B2
(45) Date of Patent: Jun. 15, 2021

(54) SYSTEM AND METHOD FOR COORDINATION AMONG A PLURALITY OF VEHICLES

(71) Applicant: BAE Systems plc, London (GB)

(72) Inventors: Roderick Buchanan, Preston (GB); Richard Charles Freeman, Preston (GB); David William Thomas Clark, Preston (GB); Andrew James Thomas, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/468,506

(22) PCT Filed: Dec. 4, 2017

(86) PCT No.: PCT/GB2017/053650
§ 371 (c)(1),
(2) Date: Jun. 11, 2019

(87) PCT Pub. No.: WO2018/109438
PCT Pub. Date: Jun. 21, 2018

(65) Prior Publication Data
US 2020/0082728 A1 Mar. 12, 2020

(30) Foreign Application Priority Data
Dec. 12, 2016 (GB) ........................................ 1621113
Feb. 22, 2017 (EP) ...................................... 17275023

(51) Int. Cl.
*G08G 5/00* (2006.01)
*G07C 5/00* (2006.01)
*G05D 1/00* (2006.01)

(52) U.S. Cl.
CPC ......... *G08G 5/0008* (2013.01); *G05D 1/0088* (2013.01); *G07C 5/008* (2013.01); *G08G 5/0021* (2013.01)

(58) Field of Classification Search
CPC .. G08G 5/0008; G08G 5/0021; G08G 5/0052; G05D 1/0088; G07C 5/008; G06Q 10/0631; G06Q 30/08
(Continued)

(56) References Cited

U.S. PATENT DOCUMENTS 8,620,510 B1 * 12/2013 Meuth .................... G06Q 10/04
701/26
2007/0112700 A1 * 5/2007 Den Haan ............ G05D 1/0278
706/14
(Continued)

OTHER PUBLICATIONS

Dias M B et al: Market-Based Multirobot Coordination: A Survey and Analysis, Proceedings of the IEEE, IEEE. New York, US, vol. 94, No. 7, Jul. 1, 2006, pp. 1257-1270, XP011442759, ISSN: 0018-9219, DOI: 10.1109/JPROC.2006.876939 (Year: 2006).*
(Continued)

*Primary Examiner* — Maceeh Anwari
(74) *Attorney, Agent, or Firm* — Maine Cemota & Rardin (57) ABSTRACT

A method for coordinating a plurality of vehicles (102, 104) comprising: defining, as a command vehicle (C), a vehicle in the plurality; storing, by one or more storage devices (204) located on one or more of the vehicles (102, 104), a list of capabilities of each vehicle (102, 104); receiving, by one or more processors (202) on the command vehicle (C), a specification of a goal; based on the stored vehicle capabilities, allocating, by the one or more processors (202), to one or more of the vehicles (102, 104), one or more tasks, the one or more tasks being such that, if each of those tasks was to be performed, the goal would be accomplished; and sending, from the command vehicle (C), to each vehicle
(Continued)

(102, 104) to which a task has been allocated, a specification of the one or more tasks allocated to that vehicle (102, 104).

18 Claims, 6 Drawing Sheets

(58) Field of Classification Search
USPC .......................................................... 701/120
See application file for complete search history.

(56) References Cited

U.S. PATENT DOCUMENTS

| | | |
|---|---|---|
| 2014/0025228 A1 | 1/2014 | Jang et al. |
| 2014/0074339 A1* | 3/2014 | Casado ................. G05D 1/104 |
| | | 701/24 |
| 2014/0081479 A1 | 3/2014 | Vian et al. |
| 2017/0190104 A1* | 7/2017 | Bostick ................. B29C 64/20 |

OTHER PUBLICATIONS

PCT International Search Report and Written Opinion for Appl No. PCT/GB2017/053650 dated Feb. 12, 2018, 8 pages.
Dias M B et al: Market-Based Multirobot Coordination: A Survey and Analysis, Proceedings of the IEEE, IEEE. New York, US, vol. 94, No. 7, Jul. 1, 2006, pp. 1257-1270, XP011442759, ISSN: 0018-9219, DOI: 10.1109/JPROC.2006.876939.
PCT International Search Report and Written Opinion for Appl No. PCT/GB2017/053650 dated Jun. 18, 2019, 7 pages.
Extended European Search Report for Appl No. 17275023.4 dated Sep. 26, 2017, 7 pages.
Great Britain Search Report for Appl No. GB1621113.8 dated May 31, 2017, 4 pages.

* cited by examiner

SYSTEM AND METHOD FOR COORDINATION AMONG A PLURALITY OF VEHICLES

RELATED APPLICATIONS

This application is a national phase application filed under 35 USC § 371 of PCT Application No. PCT/GB2017/053650 with an International filing date of 4 Dec. 2017 which claims priority of GB Patent Application 1621113.8 filed 12 Dec. 2016 and EP Patent Application 17275023.4, filed 22 Feb. 2017. Each of these applications is herein incorporated by reference in their entirety for all purposes.

FIELD OF THE INVENTION

The present invention relates to systems and methods for coordination among a plurality of vehicles.

BACKGROUND

In many situations, a team of vehicles, such as aircraft, are coordinated to work together to accomplish a common goal. Different vehicles in the team may have different capabilities. For example, some vehicles in the team may be capable of gathering information regarding their environment and potential threats or targets therein, while other vehicles in the team may be capable of engaging with and destroying those threats or targets.

A vehicle in the team may, for example, be an unmanned vehicle comprising autonomous control systems configured to make decisions and control the actions of the vehicle. Alternatively, a vehicle in the team may be a manned vehicle controlled primarily by a human on board that vehicle.

In some conventional vehicle coordination systems, a single entity has centralised control over the entire team. However, destruction or incapacitation of the central controller may result in a loss of ability of the team to complete the goal. Also, in some situations, a central controller may be inappropriate in situations where that central controller is remote from other members of the team and, as a result, cannot adequately direct those other team members.

SUMMARY OF THE INVENTION

In a first aspect, the present invention provides a method for coordination among a plurality of vehicles. The method comprises: defining, as a command vehicle, a vehicle in the plurality of vehicles; storing, by one or more storage devices located on board one or more of the plurality of vehicles, for each vehicle in the plurality of vehicles, a list of capabilities of that vehicle; receiving, by one or more processors on board the command vehicle, a specification of a goal that is to be accomplished by the plurality of vehicles, the one or more processors being operatively coupled to the one or more storage devices; based on the stored vehicle capabilities, allocating, by the one or more processors located on board the command vehicle, to one or more of the vehicles in the plurality of vehicles, one or more tasks, the one or more tasks being such that, if each of those tasks were to be performed, the goal would be accomplished; and sending, from the command vehicle, to each vehicle in the plurality of vehicles to which a task has been allocated, a specification of the one or more tasks allocated to that vehicle.

The method may further comprise performing, by each vehicle in the plurality of vehicles to which a task has been allocated, the one or more tasks allocated to that vehicle.

The step of performing the one or more tasks may be performed responsive to each vehicle in the plurality of vehicles to which a task has been allocated sending an acceptance message to the command vehicle.

The method may further comprise, prior to the step of allocating, by the one or more processors on board the command vehicle, using the stored vehicle capabilities, validating the specification of the goal by verifying that one or more vehicles in the plurality of vehicles are capable of, alone or in combination, achieving the goal.

The step of sending may be performed responsive to the one or more processors on board the command vehicle receiving an input indicative of an approval of the allocation of the one or more tasks to the one or more vehicles in the plurality of vehicles.

The method may further comprise: storing, by the one or more storage devices located on board one or more of the plurality of vehicles, for each of one or more different types of goal, one or more rules; and, responsive to receiving the specification of the goal, acquiring, by the one or more processors on board the command vehicle, one or more rules corresponding to specified goal. The one or more tasks may be such that, if each of those tasks were to be performed, the goal would be accomplished in accordance with the acquired one or more rules.

The step of allocating may comprise: generating, by the one or more processors located on board the command vehicle, for each vehicle in the plurality, a bid value indicative of a capability of that vehicle performing one or more of the tasks; and allocating, by the one or more processors located on board the command vehicle, the one or more tasks to one or more of the vehicles in the plurality of vehicles based on the generated bid values.

The step of allocating may comprise: for one or more of the vehicles in the plurality of vehicles other than the command vehicle, generating, by one or more further processors located on board that vehicle, a bid value indicative of a capability of that vehicle performing one or more of the tasks; sending, from the one or more vehicles on which a bid value has been generated, to the command vehicle, the bid value generated on that vehicle; and allocating, by the one or more processors located on board the command vehicle, the one or more tasks to one or more of the vehicles in the plurality of vehicles based on the received bid values.

The lists of capabilities of each vehicle may be stored on the command vehicle.

The lists of capabilities of each vehicle may be stored on each of the vehicles in the plurality.

The method may further comprise defining, as the command vehicle, a different vehicle in the plurality of vehicles to the vehicle previously defined as the command vehicle.

The method may further comprise, responsive to a change in the vehicles in the plurality and/or a change in the capabilities of one or more of the vehicles, updating the vehicle information stored by the one or more storage devices.

Each vehicle in the plurality of vehicles may be an aircraft. The step of receiving the specification of the goal may comprise: inputting, by a user on the command vehicle, using a user interface, the specification of the goal; and sending, by the user interface, to the one or more processors on board the command vehicle, the specification of the goal.

In a further aspect, the present invention provides apparatus for coordination among a plurality of vehicles. The apparatus comprises: one or more storage devices located on board one or more of the plurality of vehicles, the one or more storage devices configured to store, for each vehicle in the plurality of vehicles, a list of capabilities of that vehicle; one or more processors on board a vehicle in the plurality of vehicles that is defined to be a command vehicle, the one or more processors configured to: receive a specification of a goal that is to be accomplished by the plurality of vehicles; based on the stored vehicle capabilities, allocate to one or more of the vehicles in the plurality of vehicles, one or more tasks, the one or more tasks being such that, if each of those tasks were to be performed, the goal would be accomplished; and send, from the command vehicle, to each vehicle in the plurality of vehicles to which a task has been allocated, a specification of the one or more tasks allocated to that vehicle.

In a further aspect, the present invention provides a program or plurality of programs arranged such that when executed by a computer system or one or more processors it/they cause the computer system or the one or more processors to operate in accordance with the method of any of the above aspects.

DETAILED DESCRIPTION

Figure 1:
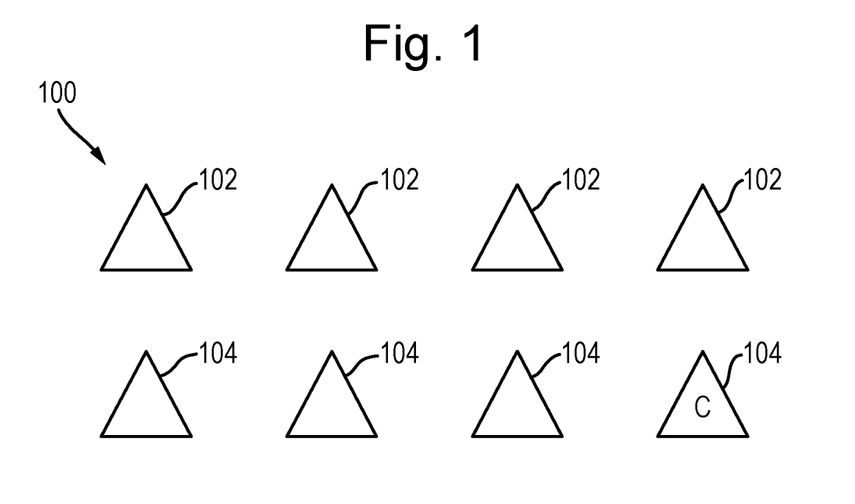
FIG. 1 is a schematic illustration (not to scale) of an example team of aircraft.

FIG. 1 is a schematic illustration (not to scale) of an example team of aircraft 100 in which an embodiment of a goal-based planning system and method are implemented.

In this embodiment, the team 100 comprises four reconnaissance aircraft 102, and four combat aircraft 104.

The reconnaissance aircraft 102 are manned aircraft. The reconnaissance aircraft 102 may be any appropriate type of aircraft that are configured to carry out aerial reconnaissance operations. In this embodiment, these aerial reconnaissance operations include, but are not limited to, imaging operations, signal measurement operations, and signature measurement operations. The imaging operations may include a reconnaissance aircraft 102 capturing images, for example visual light or infrared images, of an area of an environment in the vicinity of that reconnaissance aircraft 102. The signal measurement operations may include a reconnaissance aircraft 102 intercepting communication signals between other parties and/or measuring non-communication electronic signals in its vicinity. The signature measurement operations may include a reconnaissance aircraft 102 detecting and/or tracking signatures (i.e. distinctive characteristics) of target sources within the vicinity of that reconnaissance aircraft 102, and/or identifying a target source based on its signature.

In this embodiment, the reconnaissance aircraft 102 are equipped with sensors and processing equipment for the performance of the aerial reconnaissance operations. Such sensors and processing equipment may include, for example, radar systems, camera systems, and acoustic signal measurement systems.

In some embodiments, the reconnaissance aircraft 102 are substantially identical and are configured to perform the same aerial reconnaissance operations as each other, i.e. the reconnaissance aircraft 102 may have substantially the same capabilities as each other. However, in other embodiments, one or more of the reconnaissance aircraft 102 is different from one or more of the other reconnaissance aircraft 102, and may be configured to perform a different set of aerial reconnaissance operations to those performable by the other reconnaissance aircraft 102, In other words, in some embodiments, the reconnaissance aircraft 102 may have different capabilities.

In this embodiment, each of the reconnaissance aircraft 102 is configured for two-way communication with each of the other reconnaissance aircraft 102 and also each of the combat aircraft 104.

The combat aircraft 104 are manned aircraft. Each combat aircraft 104 may be any appropriate type of combat aircraft such as a fighter aircraft (e.g. a fast jet), a bomber, or an attack aircraft. The combat aircraft 104 may be configured to carry out any appropriate type of combat operations such as, but not limited to, air-to-air combat operations, ground attacks, close air support for ground troops, and electronic warfare operations.

In this embodiment, the combat aircraft 104 are equipped with appropriate sensor systems, processing systems, and weaponry for the performance of their combat operations. Such systems and weaponry may include, but is not limited to, target detection and tracking systems, missile guidance systems, and a variety of weapons which may include machine guns, cannons, rockets and guided missiles.

In some embodiments, the combat aircraft 104 are configured to perform the same combat operations as each other, i.e. the combat aircraft 104 may have substantially the same capabilities as each other. However, in other embodiments, one or more of the combat aircraft 104 is configured differently to one or more of the other combat aircraft 104, and may be configured to perform a different set of combat operations to those performable by the other combat aircraft 104. In other words, in some embodiments, the combat aircraft 104 may have different capabilities.

In this embodiment, each of the combat aircraft 104 is configured for two-way communication with each of the other combat aircraft 104 and also each of the reconnaissance aircraft 102.

In this embodiment, one of the combat aircraft 4 is designated as a "command aircraft" or "commander". The command aircraft is indicated in the Figures by the reference symbol C. The functionality of the command aircraft C is described in more detail later below.

Figure 2:
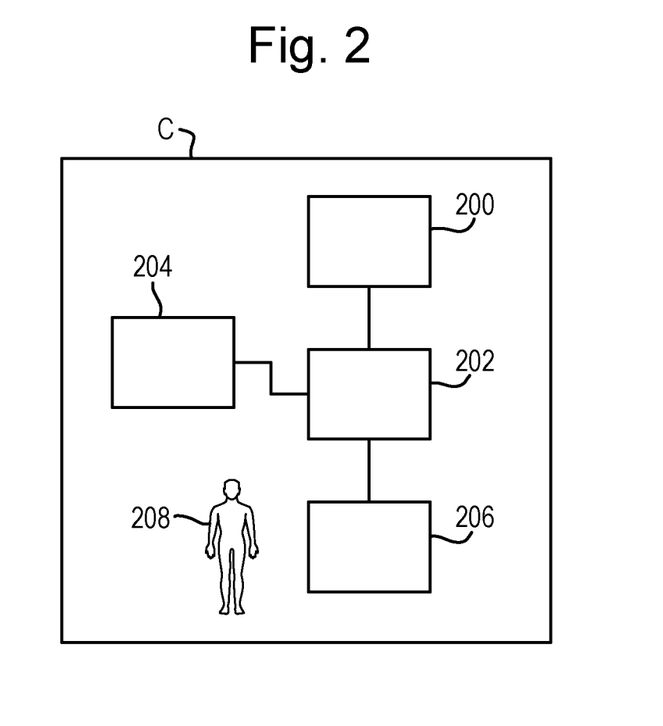
FIG. 2 is a schematic illustration (not to scale) showing further details of an aircraft of the team of aircraft.

FIG. 2 is a schematic illustration (not to scale) showing further details of the command aircraft C in this embodiment.

The command aircraft C comprises a goal-based planning system comprising transceiver 200, an aircraft cooperation module 202, a memory 204, a pilot interface 206. The command aircraft C further comprises a pilot 208.

In this embodiment, each other aircraft 102, 104 in the team 100 comprises a respective goal-based planning system which may be substantially identical to that of the command aircraft C. The goal-based planning systems of the other aircraft 102, 104 in the team C comprise respective transceivers, aircraft cooperation modules, memories, and pilot interfaces. Thus, each other aircraft 102, 104 in the team 100 is capable of performing the below described role of the command aircraft C, for example if the current command aircraft leaves the team 100.

The transceiver 200 is configured to send communications signals from the command aircraft C to one or more (e.g. all) of the other aircraft 102, 104 in the team 100. The transceiver 200 is further configured to receive communication signals transmitted by one or more of the other aircraft 102, 104 to the command aircraft C. The transceiver 200 is connected to the aircraft cooperation module 202 such that signals may be sent between the transceiver 200 and the aircraft cooperation module 202.

The aircraft cooperation module 202 comprises one or more processors configured to process signals received by the aircraft cooperation module 202, and to output signals to other modules connected to the aircraft cooperation module 202. The aircraft cooperation module 202 is described in more detail later below with reference to FIG. 3. The processing of information by the aircraft cooperation module 202 is described in more detail later below with reference to FIGS. 6 to 11. In addition to being connected to the transceiver 200, the aircraft cooperation module 202 is connected to the memory 204 such that information may be stored in the memory 204 by the aircraft cooperation module 202, and such that information stored in the memory 204 may be retrieved or otherwise acquired by the aircraft cooperation module 202. The aircraft cooperation module 202 is further connected to the pilot interface 206 such that signals may be sent between the aircraft cooperation module 202 and the pilot interface 206.

The memory 204 is a computer hardware device that stores information for use by aircraft cooperation module 202. In this embodiment, the memory 204 is a non-volatile memory. The memory 204 is described in more detail later below with reference to FIG. 4.

The pilot interface 206 is a user interface that allows effective operation and control of the aircraft cooperation module 202 by the pilot 208 of the command aircraft C, while also feeding back information to the pilot 208 to aid the pilot's decision-making process. The pilot interface 206 is located in a cockpit of the command aircraft C. The pilot interface 206 is described in more detail later below with reference to FIG. 5.

The pilot 208 is located in a cockpit of the command aircraft C. The pilot 208 is trained to engage in air-to-air and air-to-ground combat using the command aircraft C. The pilot 208 is also trained in the use of the goal-based planning system of the command aircraft C. In this embodiment, the pilot 208 of the command aircraft C is a leader or commander of the pilots of the aircraft 102, 104 in the team 100. An embodiment of a method in which the pilot 208 operates the goal-based planning system via the pilot interface 206 is described in more detail later below with reference to FIGS. 6 to 11.

Figure 3:
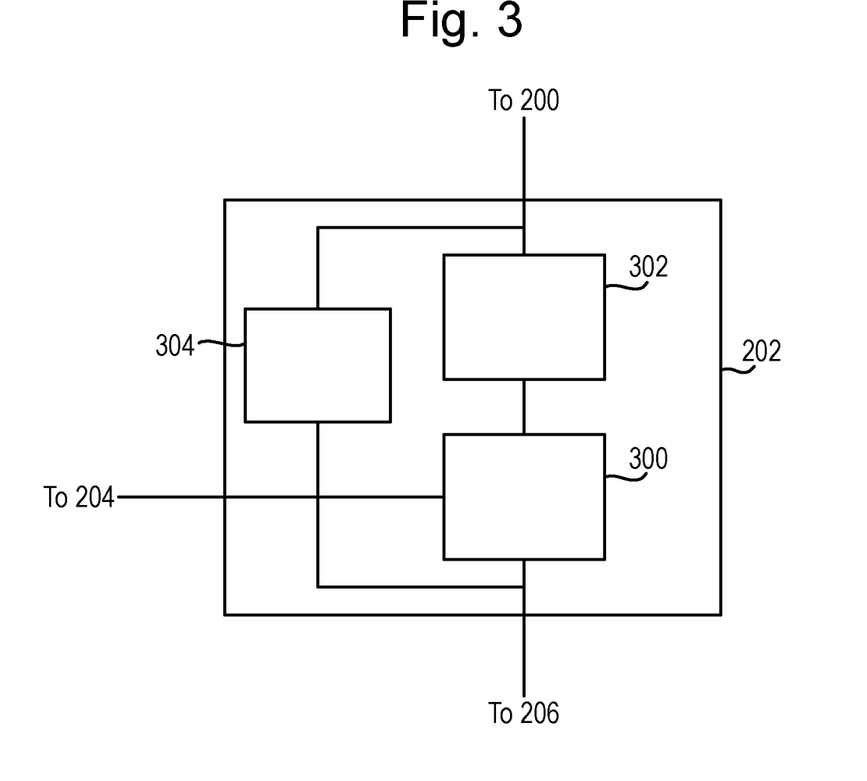
FIG. 3 is a schematic illustration (not to scale) showing an aircraft cooperation module of the aircraft.

FIG. 3 is a schematic illustration (not to scale) showing further details of the aircraft cooperation module 202 in this embodiment.

The aircraft cooperation module 202 comprises a validation module 300, an allocation module 302, and a reporting module 304.

In this embodiment, an input of the validation module 300 is connected to the pilot interface 206 such that information input to the pilot interface 206 by the pilot 208 is received by the validation module 300. The validation module 300 is configured to process information received from the pilot interface 206 as described in more detail later below with reference to FIGS. 6 to 11. The validation module 300 is connected to the memory 204 such that the validation module 300 may store information in the memory 204, and such that the validation module 300 may acquire information stored in the memory 204 for use in processing. An output of the validation module 300 is connected to the allocation module 302 such that an output of the validation module 300 may be sent from the validation module 300 to the allocation module 302.

In this embodiment, an input of the allocation module 302 is connected to the validation module 300 such that the output of the validation module 300 is received by the allocation module 302. The allocation module 302 is configured to process information received from the validation module 300 as described in more detail later below with reference to FIGS. 6 to 11. An output of the allocation module 302 is connected to the transceiver 200 such that an output of the allocation module 302 may be sent from the allocation module 302 to the transceiver 200 for transmission to the other aircraft 102, 104 in the team 100.

In this embodiment, an input of the reporting module 304 is connected to the transceiver 200 such that information received by the transceiver 200 is received by the reporting module 304. The reporting module 304 is configured to process information received from the transceiver 200 as described in more detail later below with reference to FIGS. 6 to 11. An output of the reporting module 304 is connected to the pilot interface 206 such that the output of the reporting module 304 may be sent to the pilot interface 206 for display to the pilot 208.

Figure 4:
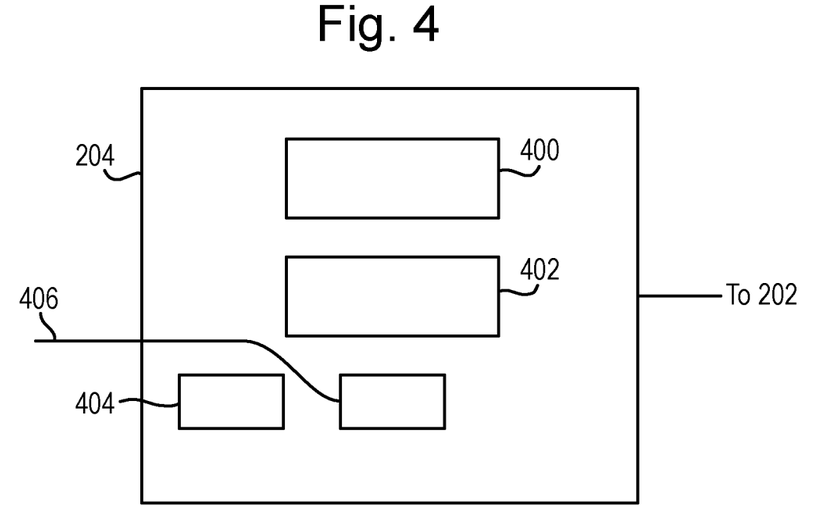
FIG. 4 is a schematic illustration (not to scale) showing further details of a memory or storage device of the aircraft.

FIG. 4 is a schematic illustration (not to scale) showing further details of the memory 204 in this embodiment.

In this embodiment, the memory 204 comprises a doctrine table 400, a rules of engagement document 402, a list of goal types 404, and an asset list 406.

The doctrine table 400 comprises a plurality of rules and/or criteria that apply to certain goals of the team 100. The doctrine table 400 is described in more detail later below with reference to FIGS. 6 to 11.

The rules of engagement document 402 specifies rules or directives for the team 100 relating to the use of force and the employment of certain specific combat capabilities. The rules of engagement document 402 may provide authorization for and/or limits on said use of force and employment of combat capabilities. The rules of engagement document 402 may define the Rules of Engagement for the particular mission being undertaken by the team 100.

The list of goal types 404 includes a list of all the types of goal that may be attempted by the team 100. The terminology "goal type" may refer to a generic goal or result that the team 100 is to plan and commit to achieve. Examples of goal type for the team 100 include, but are not limited to, an air search (which involves the team 100 searching a volume of airspace for a given target or type of target), a surface search (which involves the team 100 searching an area on the surface of the Earth for a given target or type of target), a target tracking goal (which involves the team 100 tracking the movements of a given target), and a payload delivery goal (which involves the team 100 delivering one or more payloads from one or more of the aircraft 102, 104 to one or more given targets).

The asset list 406 comprises a list of each of the aircraft 102, 104 (i.e. team members) in the team 100. The asset list 406 further comprises, for each aircraft 102, 104 in the team 100, the capabilities of that aircraft 102, 104. The asset list 406 may be updated during operation, for example, as aircraft leave the team 100, or new aircraft join the team 100, or as aircraft abilities change.

Figure 5:
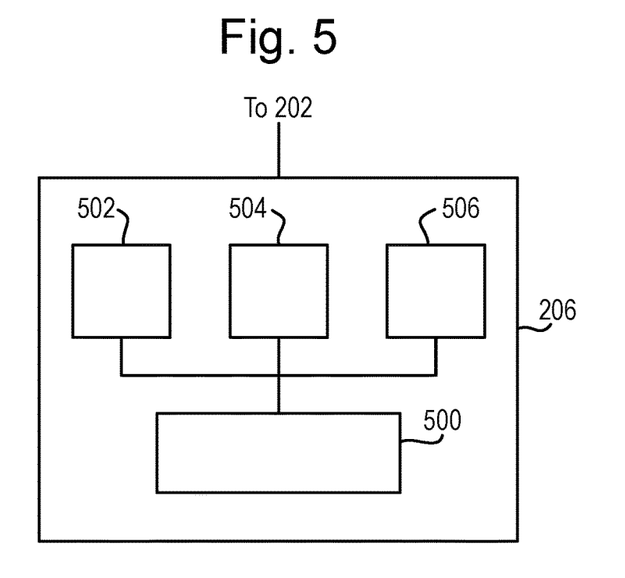
FIG. 5 is a schematic illustration (not to scale) showing further details of a pilot interface of the aircraft.

FIG. 5 is a schematic illustration (not to scale) showing further details of the pilot interface 206 in this embodiment.

In this embodiment, the pilot interface 206 comprises a user input device 500, a goal display 502, a situation awareness display 504, and an asset list display 506.

The user input device 500 may comprise any appropriate device or devices using which the pilot 208 may input information. Examples of user input devices include, but are not limited to, touchscreen displays, voice recognition systems, graphical user interfaces, and joysticks. The user input device 500 is connected to each of the goal display 502, the situation awareness display 504, and the asset list display 506, such that information may be displayed on the goal display 502, the situation awareness display 504, and/or the asset list display 506. Also, the user input device 500 is connected to the input of the aircraft cooperation module 202 such that information (e.g. a pilot input) may be sent from the user input device 500 to the aircraft cooperation module 202 for processing.

The goal display 502 is a display, for example a head-up display, for displaying, to the pilot 208, a list of currently selected goals for the team 100 and a status of those goals. The information displayed by the goal display 502 may include a list of the constituent tasks for each selected goal, and may further include a status of one or more of those tasks. The goal display 502 and the information that is displayed on the goal display 502 is described in more detail later below with reference to FIGS. 6 to 11.

The situation awareness display 504 is a display, for example a head-up display, for displaying, to the pilot 208, relative positions, orientations, and movement of the aircraft 102, 104 in the team 100. The situation awareness display 504 may display a location and, where applicable, an extent of physically-defined tasks, such as searches. In some embodiments, the situation awareness display 504 displays a map onto which symbology may be overlaid. The situation awareness display 504 and the information that is displayed on the situation awareness display 504 is described in more detail later below with reference to FIGS. 6 to 11.

The asset list display 506 is a display, for example a head-up display, for displaying, to the pilot 208, a list of each of the aircraft 102, 104 (i.e. assets) in the team 100 and their corresponding capabilities. The information displayed by the asset list display 506 may include, but is not limited to, for one or more of the aircraft, a list of tasks allocated to that aircraft and a status of one or more of those tasks; an indication of what that aircraft is currently doing; a list of the remaining stores on that aircraft; and/or a current fuel level and/or remaining endurance of that aircraft. The asset list display 506 and the information that is displayed on the asset list display 506 is described in more detail later below with reference to FIGS. 6 to 11.

Apparatus, including the aircraft cooperation module 202, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 6:
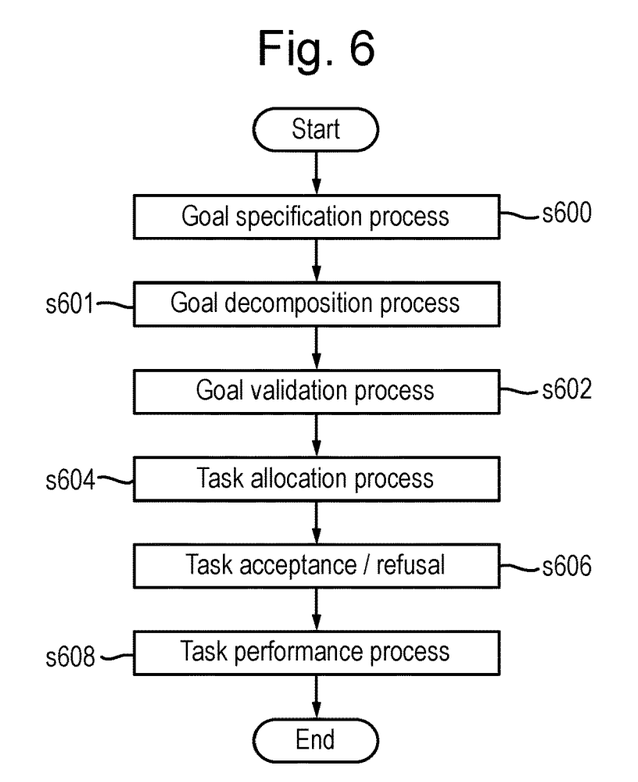
FIG. 6 is a process flow chart showing certain steps of an embodiment of a goal-based planning method implemented by the team of aircraft.

FIG. 6 is a process flow chart showing certain steps of an embodiment of a goal-based planning method implemented by the team 100.

It should be noted that certain of the process steps depicted in the flowcharts of FIGS. 6 to 11 and described below may be omitted or such process steps may be performed in differing order to that presented below and shown in FIGS. 6 to 11. Furthermore, although all the process steps have, for convenience and ease of understanding, been depicted as discrete temporally-sequential steps, nevertheless some of the process steps may in fact be performed simultaneously or at least overlapping to some extent temporally.

At step s600, the command aircraft C performs a goal specification process. The goal specification process performed in this embodiment is described in more detail later below with reference to FIG. 7. In this embodiment, the goal specification process generates a specification of a goal that is to be accomplished, or attempted, by the aircraft 102, 104 in the team 100.

At step s601, the validation module 300, or a different appropriate module, decomposes the specified goal into one or more tasks. The one or more tasks are such that, if each of those tasks was performed, the specified goal would be accomplished. In this embodiment, each of the tasks into which the specified goal is split is performable by one or more aircraft 102, 104 in the team 100.

At step s602, the validation module 300 performs a goal validation process. The goal validation process performed in this embodiment is described in more detail later below with reference to FIG. 8. In this embodiment, the goal validation process validates the goal specification to ensure that the team 100 is capable of accomplishing the specified goal.

In this embodiment, the validation process is performed to validate each of the one or more tasks into which the specified goal has been decomposed. The specified goal is only deemed to be valid if all its constituent tasks are deemed valid by the validation module 300.

At step s604, the allocation module 302 performs a task allocation process using the validated goal specification. The task allocation process performed in this embodiment is described in more detail later below with reference to FIG. 9.

In this embodiment, the task allocation process is performed to allocate, to the aircraft in the team 100, each of the tasks into which the specified goal has been decomposed.

At step s606, the aircraft 102, 104 in the team 100 perform a task refusal/acceptance process using the tasks allocated to them at step s604. The task refusal/acceptance process performed in this embodiment is described in more detail later below with reference to FIG. 10. In this embodiment, the task refusal/acceptance process is performed such that each task is assigned to an aircraft 102, 104 that has agreed or accepted to undertake that task.

At step s608, the aircraft 102, 104 in the team 100 perform a task performance process. The task performance process performed in this embodiment is described in more detail later below with reference to FIG. 11. In this embodiment, the task performance process is performed such that each of the aircraft 102, 104 perform the task(s) allocated to that aircraft, thereby accomplishing the goal by the team 100.

Thus, an embodiment of the goal-based planning method implemented by the team 100 is provided.

Figure 7:
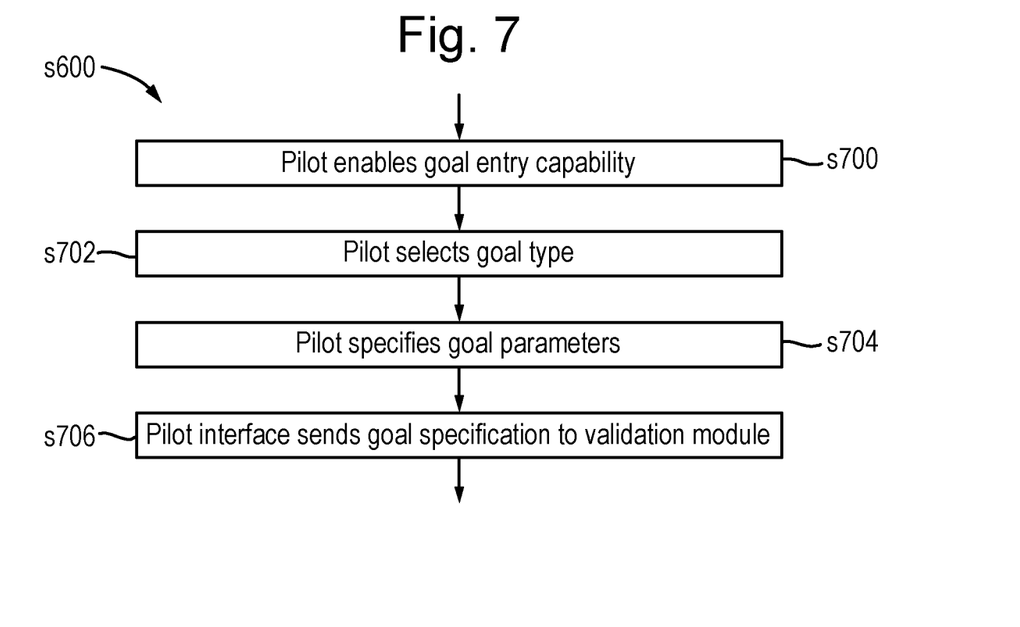
FIG. 7 is a process flow chart showing certain steps of a goal specification process performed during the goal-based planning method.

FIG. 7 is a process flow chart showing certain steps of the goal specification process performed at step s600.

At step s700, the pilot 208 enables a goal entry capability of the aircraft cooperation module 202, for example, by selecting an appropriate input of the pilot interface 206.

At step s702, using the pilot interface 206, the pilot 208 selects a goal type for a goal that is to be achieved by the team 100. The goal type is selected from the list of goal types 404 stored in the memory 204.

At step s704, using the pilot interface 206, the pilot 208 specifies one or more parameters of the selected goal type, thereby generating a "goal specification" of a specific goal that is to be completed by the team 100.

By way of example, if an air or surface search has been selected as the goal type, the parameters that are specified by the pilot 208 may include, but are not limited to, coordinates that define a boundary of the region to be searched, and specific entities that are to be searched for. In some embodiments, the pilot 208 may specify the region to be search by drawing a box representative of the region on the situation display 504 of the pilot interface 206. Examples of entities that are to be searched for in an air search may include, but are not limited to, fighter aircraft, bomber aircraft, attack aircraft, Low-observable (LO) aircraft, and missiles. Examples of entities that are to be searched for in a surface search may include, but are not limited to, tanks, trucks, people, ships, and radar emitters.

Also by way of example, if a target tracking goal type has been selected as the goal type, the parameters that are specified by the pilot 208 may include, but are not limited to, an identity of the target that is to be tracked, a region of airspace in which a team member must operate while tracking, and a length of time to track the target for.

Also by way of example, if a payload delivery goal type has been selected as the goal type, the parameters that are specified by the pilot 208 may include, but are not limited to, an identity of the one or more targets that are to receive a payload, and an identity of one or more payloads that are to be delivered to each identified target (e.g. a missile, a bomb, support equipment, a life raft, a quantity of fire retardant material, etc.).

At step s706, the pilot interface 206 sends the goal specification to the validation module 300 of the aircraft cooperation module 202.

After step s706, the goal specification process of step s600 ends and the method proceeds to step s601.

Thus, the goal specification process performed at step s600 is provided.

Figure 8:
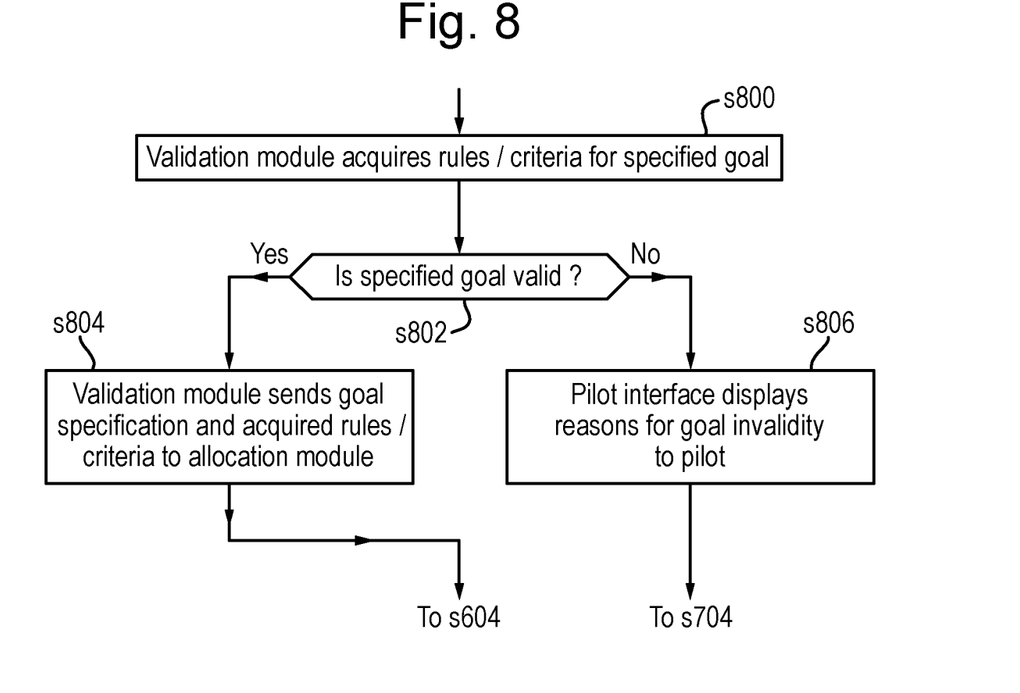
FIG. 8 is a process flow chart showing certain steps of a goal validation process performed during the goal-based planning method.

FIG. 8 is a process flow chart showing certain steps of the goal validation process performed at step s602. In the validation process, the validation module 300 receives a specification of the one or more tasks into which the specified goal has been decomposed, and determines whether or not each of those tasks is valid.

At step s800, the validation module 300 acquires, from the doctrine table 400, any rules and/or criteria that apply to the specified goal.

Examples of rules or criteria that may be included in the doctrine table 400 for a certain goal type include, but are not limited to, a minimum number of aircraft 102, 104 that must take part in achieving goals of that type, a maximum number of aircraft 102, 104 that may take part in achieving goals of that type, a requirement that goals of that type are achieved as quickly as possible, and a requirement that goals of that type are performed more than once.

In some embodiments, one or more of the acquired rules and/or criteria affect calculations used to check the validity of one or more of the tasks.

At step s802, the validation module 300 validates or otherwise the specified goal by comparing the goal specification (i.e. a specification of the one or more tasks into which the specified goal has been decomposed) to the asset list 406 stored in the memory 204. In particular, the goal specification is compared to the list of aircraft 102, 104 and their corresponding capabilities to determine whether or not the aircraft 102, 104 have capabilities sufficient to achieve the specified goal.

In some embodiments, the validation process performed at step s802 comprises the validation module 300 calculating the number of aircraft which are required to complete the specified goal. An achievable goal performance may then be calculated by the validation module 300. The validation module 300 may then compare the determined achievable goal performance to the goal specification to determine whether or not that task can be validly performed by the team 100.

By way of example, the goal specification may include a task of performing a surface search of a 100 km$^2$ area of sea for supertankers, and may further specify a 10 minute time frame for doing so. The goal validation process may include the validation module 300 searching the asset list 406 to identify those aircraft 102 in the team that are capable of searching for supertankers. The validation module 300 may then determine a search rate with which the identified aircraft 102 are able to search for supertankers, for example, the validation module 300 may determine that the team 100 is capable of searching for supertankers at a rate of 20 km$^2$/min. The validation module 300 may then determine that either the task of the specified goal is achievable by the team 100 (corresponding to a valid goal specification), or that the task of the specified goal is not achievable by the team 100 (corresponding to an invalid goal specification). For example, the validation module 300 may determine that, based on a search rate of 20 km$^2$/min, the 100 km$^2$ area may be searched in 5 minutes, which is within the specified 10 minute time frame, and therefore the task is valid. Each task into which the goal has been decomposed may be validated in similar fashion.

If at step s802 it is determined that the goal specification is valid, the method proceeds to step s804.

However, if at step s802 it is determined that the goal specification is invalid, the method proceeds to step s806. Step s806 is described in more detail later below after a description of step s804.

At step s804, the validation module sends the validated goal specification and any acquired associated rules/criteria to the allocation module 302.

After step s804, the goal validation process of step s602 ends and the method proceeds to step s604.

Returning now to the case where, at step s802, it is determined that the goal specification is invalid, at step s806 the pilot interface 206 displays the reasons for the invalidity of the goal specification to the pilot 208.

In this embodiment, after step s806, the method returns to step s704 where the pilot 208 may specify new goal parameters for the goal type. Thus, the pilot 208 may modify the goal parameters to specify a new specific goal for the team 100. The pilot 208 may modify the goal parameters based on, for example, the displayed reasons for invalidity of the initial goal specification, and/or based on the aircraft list and capabilities displayed on the asset list display 506.

In other embodiments, after step s806, the method does not return to step s704. In some embodiments, after step s806, the method proceeds to a different method step other than step s704, e.g. step s702. In some embodiments, after step s806, the method ends.

Thus, the goal validation process performed at step s602 is provided.

Figure 9:
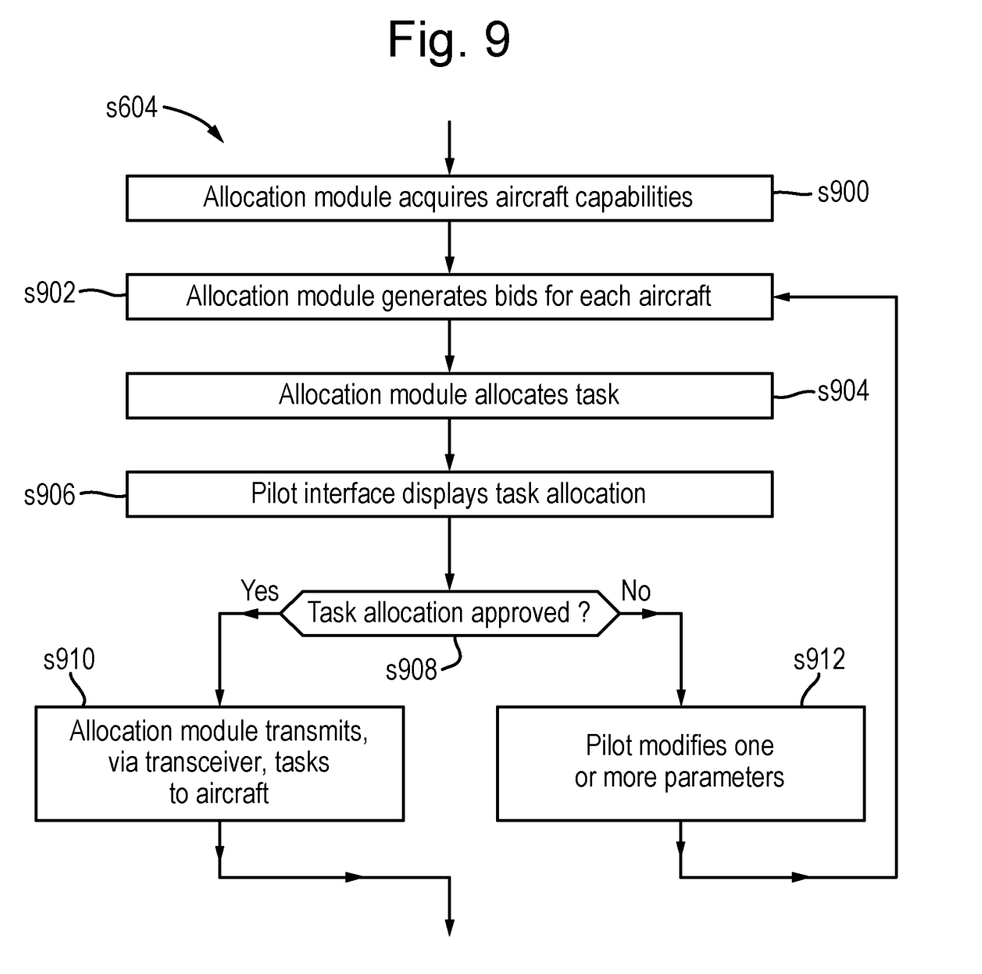
FIG. 9 is a process flow chart showing certain steps of a task allocation process performed during the goal-based planning method.

FIG. 9 is a process flow chart showing certain steps of the task allocation process performed at step s604.

At step s900, the allocation module 302 acquires, from the asset list 406, a respective list of the capabilities of each of the aircraft 102, 104 in the team 100.

At step s902, for each aircraft 102, 104 and for each task of the goal specification, the allocation module 302 generates a bid (i.e. a bid value) for that aircraft based on the capabilities of that aircraft 102, 104 and based on the goal specification and any rules and/or criteria from the doctrine table 400.

The bid generated for an aircraft 102, 104 is indicative of the capability of that aircraft 102, 104 to accomplish the relevant task in accordance with any relevant rules and/or criteria. The bid generated for an aircraft 102, 104 may be based on a current utilisation of that aircraft 102, 104. The bid generated for an aircraft 102, 104 may be based on a current position of that aircraft 102, 104.

In this embodiment, based on the aircraft capabilities, the allocation module 302 generates relatively higher bids for aircraft 102, 104 that are more capable of accomplishing the relevant task, and relatively lower bids for aircraft 102, 104 that are less capable of accomplishing that task. In other words, in this embodiments, relatively higher bids are indicative of an aircraft being better suited to performing a task, whereas relatively lower bids are indicative of an aircraft being less well suited to performing that task. However, in other embodiments, relatively lower bids may be generated for aircraft that are more capable of accomplishing the task, and relatively higher bids may be generated for aircraft that are less capable of accomplishing the task. In some embodiments, no bids are generated for aircraft 102, 104 that are not capable of accomplishing the task. In this embodiment, the allocation module 302 generates higher bids for aircraft 102, 104 that are currently less utilised, and lower bids for aircraft 102, 104 that are currently more utilised. In other words, the allocation module 302 generates higher bids for aircraft 102, 104 that currently have few and/or shorter duration tasks assigned to them, and lower bids for aircraft 102, 104 that currently have more and/or longer duration tasks assigned to them.

In this embodiment, the allocation module 302 generates higher bids for aircraft 102, 104 that are located closer to any regions specified in the goal specification, and lower bids for aircraft 102, 104 that are located further away from any regions specified in the goal specification.

In some embodiments, one or more different criteria/parameters are considered when generating bids for the aircraft 102, 104 instead of or in addition to those given above.

In this embodiment, a single round of bid generation is performed. However, in other embodiments, multiple rounds of bid generation are performed. The generated bids for the aircraft may be refined at each round of bidding.

In this embodiment, the allocation module 302 generates bids on behalf of each of the aircraft 102, 104 in the team 100. Advantageously, the allocation module 302 generating bids on behalf of the aircraft 102, 104 tends to reduce the amount of communication between the team members.

However, in other embodiments, the allocation module 302 does not generate bids for one or more of the aircraft 102, 104. For example, in some embodiments, one or more of the aircraft 102, 104 generates its own bid, and communicates that generated bid to the allocation module 302 on the command aircraft C. Advantageously, having bid generation distributed across the team 100 tends to provide for an improved bidding process, as each aircraft 102, 104 tends to have better (e.g. more up-to-date or accurate) knowledge about its state compared to the command aircraft C, and therefore tends to be able to generate a bid value that better represents its capabilities. Furthermore, the computational load on the command aircraft C tends to be reduced.

At step s904, based on the generated bids, the allocation module 302 allocates each of the tasks to one or more of the aircraft 102, 104 in the team 100. This is performed in accordance with any relevant rules and/or criteria from the doctrine table 400.

In this embodiment, a task is allocated or assigned to the aircraft corresponding to the highest bid value for that task.

In some embodiments, the goal specification comprises multiple tasks that are to be allocated amongst the aircraft in the team 100, i.e. accomplishing the specified goal may involve the completion of multiple tasks. Bid values may be generated for each aircraft 102, 104 and for each task. Each of the multiple tasks may be allocated to the aircraft 102, 104 (for example, each task may be allocated to a different respective aircraft 102, 104) based on the bid values generated for the aircraft 102, 104. In some embodiments, the system includes a goal decomposition module configured to decompose the specified goal into multiple component tasks that are then allocated amongst the team of aircraft 100.

In embodiments in which multiple tasks are allocated among the team 100, aircraft corresponding to higher bids may be prioritised in the task allocation process over aircraft with lower bids. Once a task is allocated to an aircraft, the bid of that aircraft for other tasks may be revised (e.g. reduced) to reflect its greater degree of utilisation.

In some embodiments, once a task is allocated to an aircraft and while that task is in progress, in subsequent iterations of the task allocation process of step s604, a bid of that aircraft for that task may be adjusted in order to increase the likelihood of that aircraft retaining that task allocation. For example, for an aircraft, the bids of that aircraft for tasks that that aircraft is currently performing may be increased so as to ensure that that aircraft retains the allocation of those tasks. This advantageously tends to provide stability of allocation over time, while still enabling the allocation to be overridden should that be desirable.

In some embodiments, a single task may be allocated to multiple aircraft according to the number of aircraft needed to perform that task, and/or the mix of abilities required to perform that task. In some embodiments, the multiple aircraft to which a single task is assigned are the same type of aircraft, and have the same abilities. In other embodiments, one or more of the multiple aircraft to which a single task is assigned is a different type of aircraft, and/or has different abilities, to one or more of the other aircraft to which that single task is assigned.

In some embodiments, one or more of the pilots (for example, the pilot 208 of the command aircraft C) may require or forbid the allocation of one or more specific tasks to one or more specific aircraft. This information may be input to the allocation module 302 by the pilot 208 using the input device 500. The allocation module 302 may obey any such constraints when implementing the task allocation process of step s904.

At step s906, the pilot interface 906 displays the task allocation to the pilot 208. In other words, the pilot 208 of the command aircraft C is displayed information specifying one or more tasks that are to be performed by the team 100, as well as task assignments indicating to which aircraft 102, 104 each task has been allocated.

At step s908, using the pilot interface 206, the pilot 208 accepts or refuses the displayed task assignment.

Optionally, before accepting the displayed task assignments, the pilot 208 may modify or adjust the task allocation.

If at step s908, the pilot 208 accepts or approves the displayed task assignment, the method proceeds to step s910.

However, if at step s908, the pilot 208 does not accept or approve the displayed task assignment, the method proceeds to step s912. Step s912 will be described in more detail later below after the description of step s910.

At step s910, the allocation module 302 transmits, via the transceiver 200, to each of the aircraft 102, 104, information specifying the task allocations for the whole team 100.

However, in other embodiments, one or more of the aircraft 102, 104 in the team 100 are sent only information specifying the tasks allocated to it.

After step s910, the task allocation process of step s604 ends and the method proceeds to step s606.

Returning now to the case where, at step s908, the pilot 208 does not accept the displayed task allocation, at step s912, the pilot 208 may modify one or more parameters of the specified goal, the aircraft capabilities, and/or the bid generation etc.

After step s912, in this embodiment, the method proceeds back to step s902 where the bid generation process is repeated. Thus, the pilot 208 may modify operational parameters of the system to generate a new task allocation that is acceptable.

In other embodiments, after step s912, the method does not return to step s902. Also, in some embodiments, step s912 is omitted. For example, in some embodiments, after step s912 or responsive to the task assignment not being approved at step s908, the method proceeds to a different method step other than step s912, e.g. step s702 or s704. In some embodiments, after step s912 or responsive to the task assignment not being approved at step s908, the method ends. In some embodiments, after step s912, the method proceeds back to step s602, and the modified goal undergoes the validation process, which is described in more detail earlier above.

Thus, the task allocation process performed at step s604 is provided.

Figure 10:
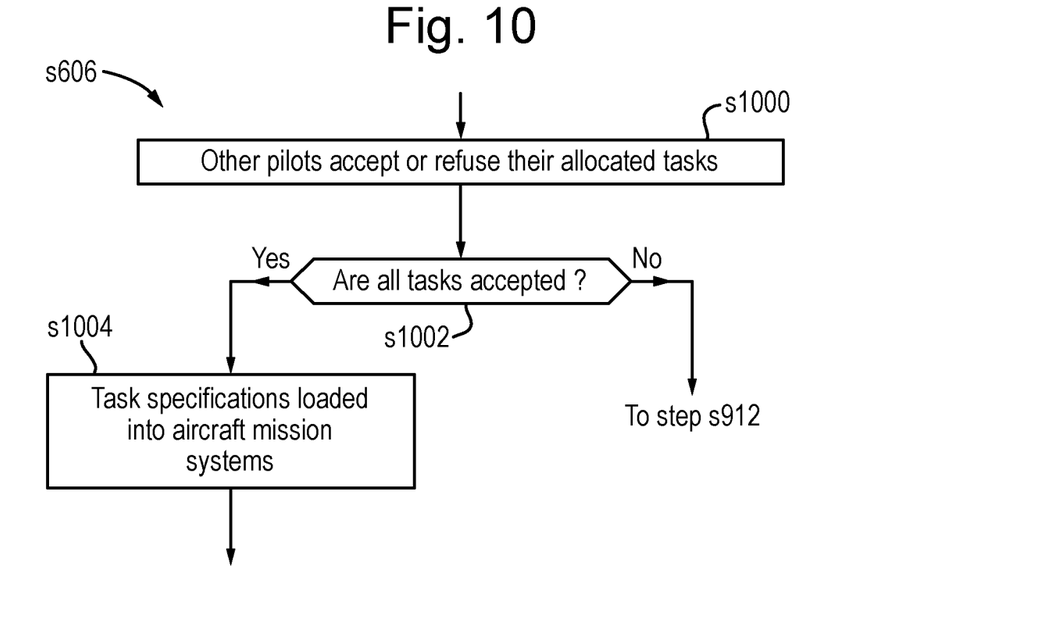
FIG. 10 is a process flow chart showing certain steps of a task refusal/acceptance process performed during the goal-based planning method.

FIG. 10 is a process flow chart showing certain steps of the task refusal/acceptance process performed at step s606.

At step s1000, each aircraft 102, 104 in the team 100 receives task allocation information for the whole team 100.

In this embodiment, the pilots of each aircraft 102, 104 either accept or refuse the task(s) that have been allocated to their aircraft 102, 104, for example using a pilot interface on board that aircraft 102, 104. This acceptance or refusal of the task allocation is reported back to the command aircraft C from each of the other aircraft 102, 104 in the team 100.

In some embodiments, if no response to the task allocation is received by the command aircraft C from another aircraft 102, 104 (for example within a predetermined time window), the command aircraft C assumes that the task allocation has been refused by that aircraft 102, 104.

In this embodiment, where the pilot of an aircraft 102, 104 refuses a task allocated to that aircraft 102, 104, that pilot inputs into their pilot interface reasons for his/her refusal of that task allocation. Examples of reasons for refusing a task allocation may include, but are not limited, that aircraft 102, 104 having a low fuel level or having sustained damage, that aircraft 102, 104 not having a requisite capability, etc. These reasons for refusal are reported back to the command aircraft C for display to the pilot 208 and/or storage.

At step s1002, the allocation module 302 determines whether or not all task allocations have been accepted by all of the aircraft 102, 104 in the team 100.

If at step s1002, it is determined that all task allocations have been accepted, the method proceeds to step s1004.

However, if at step s1002, it is determined that one or more of the task allocations has been refused, the method proceeds to back to step s912 where the pilot 208 may modify one or more parameters of the specified goal, the aircraft capabilities, and/or the bid generation process etc.

At step s1004, responsive to all the aircraft 102, 104 in the team 100 accepting their respective task allocations, the task allocations of all aircraft 102, 104 are loaded into the mission systems of the aircraft 102, 104.

In some embodiments, the task allocations and/or the goal specification is displayed to the pilot 208, e.g. on the goal display 502.

In this embodiment, each aircraft 102, 104 in the team 100 has knowledge of the tasks that have been allocated to each other aircraft 102, 104 in the team 100. Thus, if one aircraft 102, 104 subsequently cannot perform a task that was allocated to it (e.g. due to sustaining damage), another member of the team 100 may more easily commit to perform that task in place of the original aircraft 102, 104. However, in some embodiments, one or more of the aircraft 102, 104 only has knowledge of the tasks allocated to it, and not to the task allocations of the other aircraft 102, 104 in the team 100.

After step s1004, the task acceptance/refusal process of step s606 ends and the method proceeds to step s608.

Thus, the task acceptance/refusal process performed at step s606 is provided.

Figure 11:
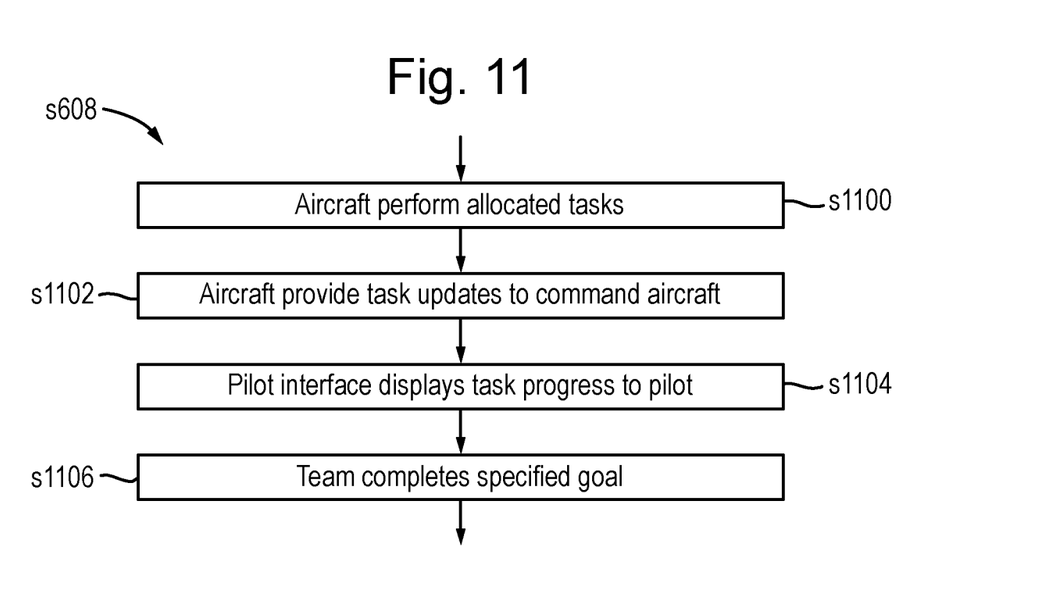
FIG. 11 is a process flow chart showing certain steps of a task performance process performed during the goal-based planning method.

FIG. 11 is a process flow chart showing certain steps of the task performance process performed at step s608.

At step s1100, each aircraft 102, 104 in the team 100 performs the task(s) that it has been allocated and that has been stored in its mission system.

At step s1102, each aircraft 102, 104 in the team to which a task has been allocated periodically or continuously sends, to the command aircraft C, a progress update indicating its progress in completing its one or more allocated tasks.

At step s1104, the reporting module 304 receives and processes progress updates from one or more of the other aircraft 102, 104 in the team 100, and displays the progress updates to the pilot 208 using the pilot interface 206. For example, in some embodiment, the progress updates from the aircraft 102, 104 may be displayed to the pilot 208 on the goal display 502, with the relative positions of the aircraft 102, 104 being displayed on the situation display 504. The progress display may be periodically or continuously updated. Preferably, the progress updates are also stored on the memory 204 for later analysis.

At step s1106, the team completes the specified goal.

Thus, the task performance process performed at step s608 is provided.

The above described methods and apparatus advantageously provide for goal-based planning and control of multi-asset systems. For example, the above described method and apparatus provide a modular control system framework for distributed operation across multiple vehicles working towards the achievement of one or more common objectives, supporting centralised, distributed and fully-decentralised variants.

Advantageously, a generic control system framework is provided which supports collaboration between multiple software agents, including negotiation and on-board planning to achieve goals (or tasks) assigned to a team of vehicles.

Advantageously, the above described methods and apparatus tends to provide that each vehicle within a team of vehicles may have the following capabilities: an ability to decompose high-level goals into an available list of sub-goals (or tasks) which can be handled separately by the team; an ability to select tasks from the available task list which best utilise that vehicle's capabilities and to collaborate with other vehicles in the team to agree on preferred team task assignments; an ability to generate a plan for the implementation of each task assigned to the vehicle; an ability to identify and resolve conflicts which exist in generated plans between vehicles by sharing plan steps and assessing what changes may be made to resolve the identified conflicts; and an ability to communicate with other vehicles in the team to share a common operating picture and to negotiate over plans and tasks.

With sharing of state information, the above described methods and apparatus tend to support planning in systems where manned, unmanned, or both manned and unmanned vehicles operate in collaboration to achieve goals.

Advantageously, the above described sharing of information tends to provide that the role of "command aircraft" can be switched from on aircraft in the team to a different aircraft in the team. This may be performed, for example, in response to the original command aircraft leaving the team, e.g., as a result of sustaining damage. Thus, the above described methods and apparatus tend to overcome problems experienced when using centralised controllers.

Advantageously, the above described methods and apparatus are flexible to allow for team members to leave the team and/or new team members to join the team. Team members leaving the team and their respective capabilities may, for example, be deleted from the maintained asset list and not included in task allocation processes. New team members joining the team may, for example, transmit an identifier and a list of capabilities to the command aircraft for inclusion in the maintained assets list, and may be subsequently incorporated for the purposes of task allocation.

Furthermore, the above described methods and apparatus are flexible to allow for team members to have varying capabilities. A team member losing a capability or opting not to use one of its capabilities, or a team member gaining a new capability, may be taken into account in a task allocation process by updating assets lists of the team.

A current list of team members and current capabilities may be displayed to the pilots of the aircraft using their respective asset list displays.

The above described apparatus tends to be modular. Rather than providing a bespoke goal-based planning system directed to a particular application with an integrated set of fixed algorithms selected at the design phase, the above described methods and apparatus tend to provide a modular design with a set of fixed interfaces between modules and enabling "plug-and-play" development of underlying algorithms. In other words, algorithms used by one type of module may be independent from those used by different types of modules, whilst the interfaces between the different types of modules may be fixed interfaces. The methods and apparatus described above also tend to provide a planning test-bed that enables combinations of task assignment, planning and task performance algorithms to be evaluated and validated e.g. before implementation in an operational environment. Such evaluation and validation may include exercising of the functionality intended for operational use in order to satisfy official certification bodies regarding public safety, etc.

The methods and apparatus described above also tends to enable performance metrics to be collected, for example relating to communications bandwidth, processor loads and plan quality metrics. By defining a set of test scenarios and gathering performance metrics, comparisons can be made, for example between different types of bidding algorithms.

A pilot of an aircraft may declare an ability of his or her aircraft as "missing" or "unavailable". This may, for example, be performed when those aircraft abilities are being used for a different, unrelated purpose to accomplishing the specified goal. Thus, a pilot may use his or her aircraft's abilities for purposes which are outside the system knowledge. This tends to enable flexible mixing of system and local usage of resources.

The system advantageously tends to assist human control over the goals and tasks of the vehicles in a time efficient manner.

In the above embodiments, the team comprises a plurality of aircraft. However, in other embodiments the team comprises one or more different types of vehicles instead of or in addition to one or more of the aircraft. For example, in some embodiments, the team includes one or more land-based or water-based vehicles.

In the above embodiments, the team comprises eight vehicles. However, in different embodiments, the team comprises a different number of vehicles.

In the above embodiments, the vehicles in the team are manned vehicles. However, in other embodiments one or more of the vehicles is an unmanned vehicle.

In the above embodiments, the vehicles in the team are controlled by human on board those vehicles. However, in other embodiments one or more of the vehicles is not controlled by a human on board that vehicle. For example, in some embodiments one or more of the vehicles is autonomous, semi-autonomous, or controlled by a human or processor remote from the vehicle.

In the above embodiment, the team comprises vehicles with reconnaissance capabilities and combat capabilities. However, in other embodiments, one or more of the vehicles has one or more capabilities instead of or in addition to reconnaissance capabilities and/or combat capabilities.

In the above embodiments, each vehicle in team comprises a respective goal-based planning system such that each vehicle is capable of acting as the command vehicle to specify goals and allocate tasks. However, in other embodiments, one or more vehicles in the team do not include a goal-based planning system and are incapable of acting as the command vehicle.

In the above embodiments, the task allocation module implements a bidding process to allocate tasks to the vehicles in the team. However, in other embodiments, one or more different task allocation algorithms are implemented instead of or in addition to the bidding process. Examples of such other task assignment algorithms include, but are not limited to, Max Sum Assignment, Brute Force Assignment, Simulated Annealing, Consensus Based Bundle Approach (CBBA), Greedy Allocation, and Mixed Integer Linear Programming (MILP).

What is claimed is:

1. A method for coordination among a plurality of manned combat aircraft vehicles, the method comprising:
    defining a goal specification process;
    defining a goal decomposition process;
    defining a goal validation process;
    defining a task allocation process;
    defining a task acceptance/refusal process;
    defining a task performance process;
    defining, as a command vehicle, a first vehicle in the plurality of vehicles;
    storing, by one or more computer hardware memory storage devices located on board one or more of the plurality of vehicles, for each vehicle in the plurality of vehicles, a list of inherent capabilities of that vehicle;
    receiving, by one or more processors on board the command vehicle, a specification of a goal that is to be accomplished by the plurality of vehicles, the one or more processors being operatively coupled to the one or more computer hardware memory storage devices;
    wherein said goal validation process comprises, prior to the step of allocating, by the one or more processors on board the command vehicle, using the stored vehicle capabilities, validating the specification of the goal by verifying that one or more vehicles in the plurality of vehicles are capable of, alone or in combination, achieving the goal;
    wherein, if said specification of said goal is valid, said goal validation process sends said goal specification and acquired rules/criteria to said allocation process;
    wherein, if said speciation of said goal is not valid, a pilot interface displays reasons for invalidity of said goal to said pilot interface of said command vehicle;
    based on the stored vehicle capabilities, allocating, by the one or more processors located on board the command vehicle, to one or more of the vehicles—in the plurality of vehicles, one or more tasks, the one or more tasks being such that, if each of those tasks was to be performed, the goal would be accomplished;
    sending, from the command vehicle, to each vehicle in the plurality of vehicles to which a task has been allocated, a specification of the one or more tasks allocated to that vehicle;
    if the command vehicle becomes unable to provide the step of allocating one or more tasks, defining, as the command vehicle, a second vehicle in the plurality of vehicles;
    wherein a step of performing the one or more tasks is performed responsive to each vehicle, in the plurality of vehicles to which a task has been allocated, sending an acceptance/refusal message to the command vehicle;
    wherein said task performance process comprises performing, by each vehicle in the plurality of vehicles to which a task has been allocated, the one or more tasks allocated to that vehicle;
    providing task updates to said command vehicle;
    displaying, on a pilot interface, task progress to a pilot of said command vehicle; and
    completing a specified goal.

2. The method according to claim 1, wherein in said goal decomposition process, said validation process decomposes a specified goal into one or more tasks, wherein, if each task was performed, said specified goal would be accomplished; and
    wherein each of said one or more tasks into which said specified goal is split is performable by one or more aircraft in a team of said plurality of vehicles.

3. The method according to claim 2, further comprising:
    storing, by the one or more computer hardware memory storage devices located on board one or more of the plurality of vehicles, for each of one or more different types of goal, one or more rules; and
    responsive to receiving the specification of the goal, acquiring, by the one or more processors on board the command vehicle, one or more rules corresponding to specified goal; and
    the one or more tasks are such that, if each of those tasks were to be performed, the goal would be accomplished in accordance with the acquired one or more rules.

4. The method according to claim 1, wherein: the method further comprises:
    storing, by the one or more computer hardware memory storage devices located on board one or more of the plurality of vehicles, for each of one or more different types of goal, one or more rules; and
    responsive to receiving the specification of the goal, acquiring, by the one or more processors on board the command vehicle, one or more rules corresponding to specified goal; and
    the one or more tasks are such that, if each of those tasks were to be performed, the goal would be accomplished in accordance with the acquired one or more rules.

5. The method according to claim 1, wherein the step of allocating comprises:
    a doctrine table comprising:
        a minimum number of aircraft that must take part in achieving goals of that type;
        a maximum number of aircraft that may take part in achieving goals of that type;
        a requirement that goals of that type are achieved as quickly as possible;
        a requirement that goals of that type are performed more than once; and
    for one or more of the vehicles in the plurality of vehicles other than the command vehicle:
    generating, by the one or more further processors located on board that vehicle, a bid value indicative of an inherent capability of that vehicle performing one or more of the tasks;
    sending, from the one or more vehicles on which a bid value has been generated, to the command vehicle, the bid value generated on that vehicle; and
    allocating, by the one or more processors located on board the command vehicle, the one or more tasks to one or more of the vehicles in the plurality of vehicles based on the received bid values.

6. The method according to claim 1, wherein the step of allocating comprises:
    for one or more of the vehicles in the plurality of vehicles other than the command vehicle, generating, by one or more further processors located on board that vehicle, a bid value indicative of a capability of that vehicle performing one or more of the tasks;

sending, from the one or more vehicles on which a bid value has been generated, to the command vehicle, the bid value generated on that vehicle; and allocating, by the one or more processors located on board the command vehicle, the one or more tasks to one or more of the vehicles in the plurality of vehicles based on the received bid values.

7. The method according to claim 1, wherein defining a task acceptance/refusal process comprises:
determining if all tasks are accepted;
if all tasks are accepted, task specifications are loaded into aircraft mission systems;
if all tasks are not accepted, one or more parameters are displayed to a pilot interface of said command vehicle to be modified.

8. The method according to claim 1, wherein the lists of inherent capabilities of each vehicle are stored on each of the vehicles in the plurality; and comprise an asset list comprising, for each aircraft:
aircraft capabilities;
remaining stores;
fuel level;
remaining endurance;
task(s) allocated;
task(s) status; and
active task(s).

9. The method according to claim 1, further comprising defining, as the command vehicle, a different vehicle in the plurality of vehicles to the vehicle previously defined as the command vehicle.

10. The method according to claim 1, further comprising, responsive to a change in the vehicles in the plurality and/or a change in the inherent capabilities of one or more of the vehicles, updating the vehicle information stored by the one or more computer hardware memory storage devices.

11. The method according to claim 1, wherein:
the step of defining a goal specification comprises:
a pilot enabling a goal entry capability;
said pilot selecting a goal type;
said pilot specifying goal parameters;
inputting, by a pilot on the command vehicle, using a user input device, the specification of the goal; and
sending, by the user input device, to the one or more processors on board the command vehicle, the specification of the goal.

12. The method according to claim 1, further comprising:
storing, by the one or more computer hardware memory storage devices located on board one or more of the plurality of vehicles, for each of one or more different types of goal, one or more rules; and
responsive to receiving the specification of the goal, acquiring, by the one or more processors on board the command vehicle, one or more rules corresponding to specified goal; and
the one or more tasks are such that, if each of those tasks were to be performed, the goal would be accomplished in accordance with the acquired one or more rules.

13. The method according to claim 1, further comprising:
storing, by the one or more computer hardware memory storage devices located on board one or more of the plurality of vehicles, for each of one or more different types of goal, one or more rules; and
responsive to receiving the specification of the goal, acquiring, by the one or more processors on board the command vehicle, one or more rules corresponding to specified goal; and
the one or more tasks are such that, if each of those tasks were to be performed, the goal would be accomplished in accordance with the acquired one or more rules.

14. The method according to claim 1, further comprising:
storing, by the one or more computer hardware memory storage devices located on board one or more of the plurality of vehicles, for each of one or more different types of goal, one or more rules; and
responsive to receiving the specification of the goal, acquiring, by the one or more processors on board the command vehicle, one or more rules corresponding to specified goal; and
the one or more tasks are such that, if each of those tasks were to be performed, the goal would be accomplished in accordance with the acquired one or more rules.

15. The method according to claim 1, further comprising:
responsive to a change in the vehicles in the plurality and/or a change in the inherent capabilities of one or more of the vehicles, updating the vehicle information stored by the one or more computer hardware memory storage devices.

16. A system for coordination among a plurality of manned combat aircraft vehicles, the system comprising the plurality of vehicles, where each vehicle in the plurality of vehicles comprises:
one or more computer hardware memory storage devices, the one or more computer hardware memory storage devices configured to store, for each vehicle, a list of inherent capabilities of that vehicle; and
a goal specification module;
a goal decomposition module;
a goal validation module;
a task allocation module;
a task acceptance/refusal module;
a task performance module; and
one or more processors, the one or more processors configured to:
in said goal specification module, receive a specification of a goal that is to be accomplished by the plurality of vehicles;
in said goal decomposition module, decompose said specified goal into one or more tasks, wherein, if each task was performed, said specified goal would be accomplished;
in said goal validation module, acquire from a doctrine table, rules/criteria for said specified goal;
determine if said specified goal is valid;
if said specified goal is valid, said validation module sends said goal specification and acquired rules/criteria to said allocation module;
if said specified goal is not valid, a pilot interface displays reasons for invalidity of said goal to said pilot interface of said command vehicle;
in said task allocation module, based on the stored vehicle capabilities, allocate to one or more of the vehicles in the plurality of vehicles, one or more tasks;
send, from one of the plurality of vehicles defined as said command vehicle, to each vehicle in the plurality of vehicles to which a task has been allocated, a specification of the one or more tasks allocated to that vehicle; and
in said task acceptance/refusal module, the one or more processors on board a vehicle in the plurality of vehicles configured to perform the one or more tasks responsive to each vehicle, in the plurality of vehicles to which a task has been allocated, send an acceptance/refusal message to the command vehicle, in said task performance module, said manned combat aircraft performing said allocated task;
said assigned manned combat aircraft providing task updates to said command vehicle;
said pilot interface displaying task progress to said pilot of said command vehicle; and
completing said specified goal.

17. A system for coordination among a plurality of manned combat aircraft vehicles, the system comprising:
a goal specification module;
a goal decomposition module;
a goal validation module;
a task allocation module;
a task acceptance/refusal module;
a task performance module;
one or more computer hardware memory storage devices located on board one or more of the plurality of manned combat aircraft vehicles, the one or more computer hardware memory storage devices configured to store, for each manned combat aircraft vehicle in the plurality of manned combat aircraft vehicles, a list of inherent capabilities of that manned combat aircraft vehicle;
storing, by the one or more computer hardware memory storage devices located on board the one or more of the plurality of manned combat aircraft vehicles, for each manned combat aircraft vehicle in the plurality of manned combat aircraft vehicles, the list of inherent capabilities of that manned combat aircraft vehicle;
defining, as a command vehicle, a first vehicle in the plurality of manned combat aircraft vehicles; and
one or more processors on board the command vehicle, the one or more processors configured to:
in said goal specification module, from a pilot of said command vehicle, enabling goal entry capability;
selecting, by said pilot of said command vehicle, a goal type from a list of goal types, using a pilot interface;
specifying, by said pilot of said command vehicle, goal parameters;
sending, from said pilot interface, a goal specification to a validation module, whereby a specification of a goal that is to be accomplished by the plurality of manned combat aircraft vehicles is received;
in said goal decomposition module, said validation module decomposes a specified goal into one or more tasks, wherein, if each task was performed, said specified goal would be accomplished; and
wherein each of said one or more tasks into which said specified goal is split is performable by one or more aircraft in a team of said plurality of vehicles;
in said goal validation module, acquire from a doctrine table rules/criteria for said specified goal;
determining if said specified goal is valid;
if said specified goal is valid, said validation module sends said goal specification and acquired rules/criteria to said allocation module;
if said specified goal is not valid, said pilot interface displays reasons for invalidity of said goal on said pilot interface of said command vehicle;
in said task allocation module, acquiring aircraft capabilities;
generating, in said allocation module, bids for each aircraft;
based on the stored manned combat aircraft vehicle capabilities, allocating to one or more of the manned combat aircraft vehicles in the plurality of manned combat aircraft vehicles, one or more tasks, in accordance with any relevant rules and criteria from said doctrine table;
displaying, on said pilot interface, said task allocation;
determining if said task allocation is approved;
if said task allocation is approved, said allocation module transmits, via a transceiver, from the command vehicle, to each manned combat aircraft vehicle in the plurality of manned combat aircraft vehicles to which a task has been allocated, a specification of the one or more tasks allocated to that manned combat aircraft vehicle;
if said task allocation is not approved, one or more parameters are displayed to said pilot interface of said command vehicle to be modified;
if the command vehicle becomes unable to provide the step of allocating one or more tasks, defining, as the command vehicle, a second vehicle in the plurality of vehicles;
in said task acceptance/refusal module, the one or more processors on board a manned combat aircraft vehicle in the plurality of vehicles configured to perform the one or more tasks responsive to each manned combat aircraft vehicle, in the plurality of manned combat aircraft vehicles to which a task has been allocated, sending, from a pilot of a task-assigned manned combat aircraft, through said pilot interface, of the manned combat aircraft vehicle, an acceptance/refusal message to the command vehicle;
determining if all tasks are accepted;
if all tasks are accepted, task specifications are loaded into aircraft mission systems;
if all tasks are not accepted, one or more parameters are displayed to said pilot interface of said command vehicle to be modified;
in said task performance module, said manned combat aircraft performing said allocated tasks;
said assigned manned combat aircraft providing task updates to said command vehicle;
said pilot interface displaying task progress to said pilot of said command vehicle; and
completing said specified goal.

18. A program or plurality of programs arranged such that, when executed by a computer system or one or more processors the program or plurality of programs cause the computer system or the one or more processors to operate in accordance with a method for coordination among a plurality of manned combat aircraft vehicles, the method comprising:
defining a goal specification process;
defining a goal decomposition process;
defining a goal validation process;
defining a task allocation process;
defining a task acceptance/refusal process;
defining a task performance process;
defining, as a command vehicle, a first vehicle in the plurality of vehicles;
storing, by one or more computer hardware memory storage devices located on board one or more of the plurality of vehicles, for each vehicle in the plurality of vehicles, a list of inherent capabilities of that vehicle;
receiving, by one or more processors on board the command vehicle, a specification of a goal that is to be accomplished by the plurality of vehicles, the one or more processors being operatively coupled to the one or more computer hardware memory storage devices;

wherein said goal validation process comprises, prior to the step of allocating, by the one or more processors on board the command vehicle, using the stored vehicle capabilities, validating the specification of the goal by verifying that one or more vehicles in the plurality of vehicles are capable of, alone or in combination, achieving the goal;

wherein, if said specification of said goal is valid, said goal validation process sends said goal specification and acquired rules/criteria to said allocation process;

wherein, if said speciation of said goal is not valid, a pilot interface displays reasons for invalidity of said goal to said pilot interface of said command vehicle;

based on the stored vehicle capabilities, allocating, by the one or more processors located on board the command vehicle, to one or more of the vehicles—in the plurality of vehicles, one or more tasks, the one or more tasks being such that, if each of those tasks was to be performed, the goal would be accomplished;

sending, from the command vehicle, to each vehicle in the plurality of vehicles to which a task has been allocated, a specification of the one or more tasks allocated to that vehicle;

if the command vehicle becomes unable to provide the step of allocating one or more tasks, defining, as the command vehicle, a second vehicle in the plurality of vehicles;

wherein a step of performing the one or more tasks is performed responsive to each vehicle, in the plurality of vehicles to which a task has been allocated, sending an acceptance/refusal message to the command vehicle;

wherein said task performance process comprises performing, by each vehicle in the plurality of vehicles to which a task has been allocated, the one or more tasks allocated to that vehicle;

providing task updates to said command vehicle;

displaying, on a pilot interface, task progress to a pilot of said command vehicle; and completing a specified goal.

* * * * *